United States Patent
Woo

(10) Patent No.: US 10,158,224 B1
(45) Date of Patent: Dec. 18, 2018

(54) MINIMIZING VOLTAGE DROP DUE TO CURRENT SURGE AT INPUT TO A VOLTAGE REGULATOR UPON TURN-ON OF THE VOLTAGE REGULATOR

(71) Applicant: Northrop Grumman Systems Corporation, Falls Church, VA (US)

(72) Inventor: Ding C. Woo, Northridge, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/875,169

(22) Filed: Jan. 19, 2018

(51) Int. Cl.
  *H02H 9/02* (2006.01)
  *G06F 1/26* (2006.01)
  *H02M 1/32* (2007.01)
  *H02M 1/36* (2007.01)

(52) U.S. Cl.
  CPC .................. *H02H 9/02* (2013.01); *G06F 1/26* (2013.01); *H02M 1/32* (2013.01); *H02M 1/36* (2013.01)

(58) Field of Classification Search
  CPC .. H02H 9/02; G06F 1/26; H02M 1/32; H02M 1/36
  USPC ......................................................... 361/93.9
  See application file for complete search history.

(56) References Cited

U.S. PATENT DOCUMENTS

2013/0200873 A1* 8/2013 Wu ........................ H02M 3/156
  323/288

OTHER PUBLICATIONS

Datasheet ST RHFL4913XX15 1.5 V rad-hard positive fixed voltage regulator 2015.*
St Life.Augmented; Rad-hard adjustable positive voltage regulator; RHFL4913A; Datasheet—Production data; Nov. 2016; Rev 18; pp. 1-29; www.st.com.

* cited by examiner

*Primary Examiner* — Kevin J Comber
(74) *Attorney, Agent, or Firm* — Patti & Malvone Law Group, LLC

(57) ABSTRACT

An exemplary apparatus provides a regulated DC voltage output from an input from supply DC voltage source. A regulation circuit having an input terminal coupled to the supply DC voltage source, an output terminal on which is provided the regulated DC voltage output, and a current control terminal capable of controlling a maximum current that can flow through the regulation circuit where a level of maximum current is controlled proportionate to an amount of resistance connected to the current control terminal. A surge control circuit connected to the current control terminal automatically supplies a variable resistance beginning with one resistance at turn-ON and varying to another resistance at a predetermined time interval after turn-ON to limit the current that can flow at turn-ON until a steady state of the regulation circuit is reached.

12 Claims, 2 Drawing Sheets

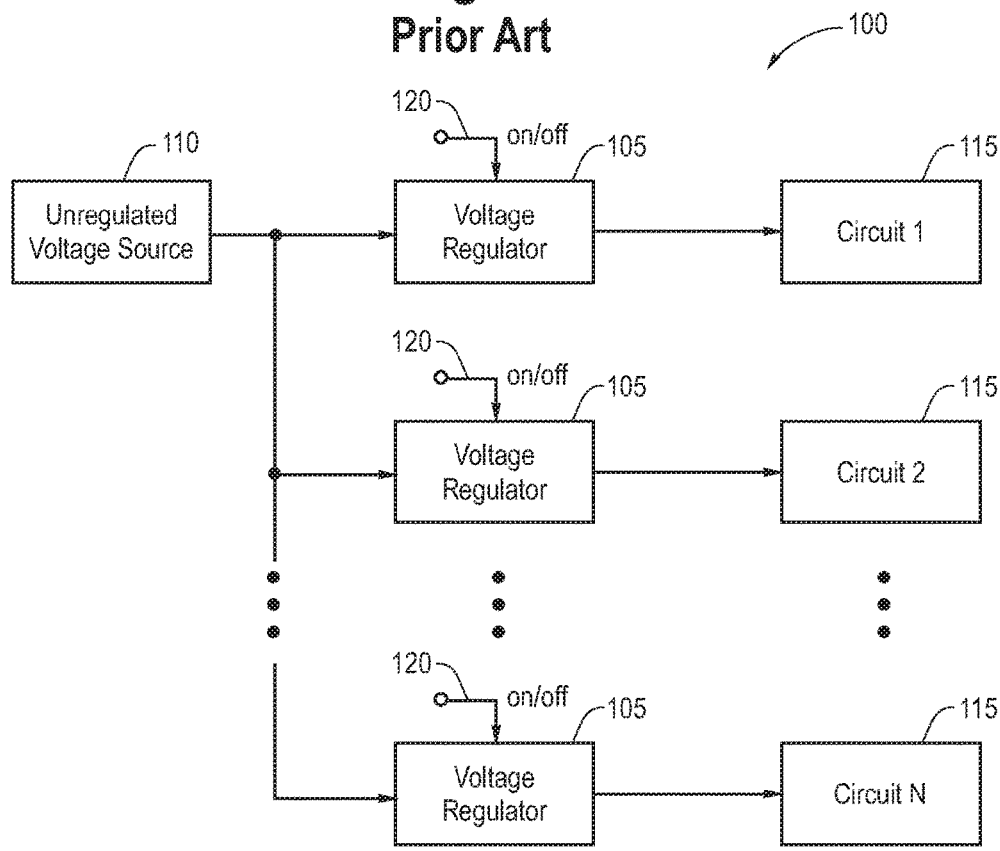
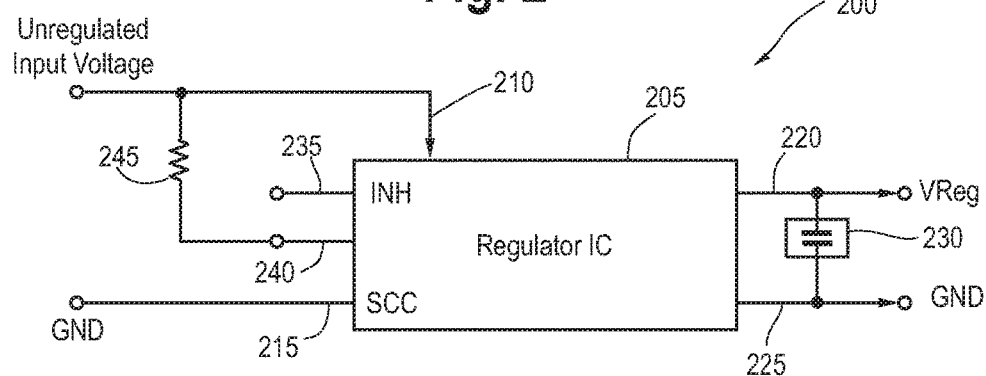

MINIMIZING VOLTAGE DROP DUE TO CURRENT SURGE AT INPUT TO A VOLTAGE REGULATOR UPON TURN-ON OF THE VOLTAGE REGULATOR

STATEMENT OF GOVERNMENT RIGHTS

This invention was made with Government support. The Government has certain rights in this invention.

BACKGROUND

This invention relates to direct current (DC) voltage regulation and an initial surge of current, typically with an associated drop in voltage, at the input of the voltage regulator upon the voltage regulator being turned from OFF to ON. The magnitude of such a current surge and associated voltage drop is greater when multiple voltage regulators are connected in parallel to the same power source and are switched from OFF to ON at substantially the same time.

Many circuits benefit from having a regulated DC supply voltage. In order to enhance output voltage stability, voltage regulator circuits often utilize a capacitor connected at the regulated output voltage terminal to ground that functions as a low pass filter to inhibit rapid voltage fluctuations at the regulated output voltage. While this is beneficial, as this output capacitor is normally in a discharged state, i.e. zero voltage across the capacitor, when the voltage regulator circuit is OFF. Depending on the resistance in series with the capacitor, large currents can initially flow upon turn-ON of the voltage regulator until the output capacitor becomes charged. Even if such a capacitor is not utilized as part of the voltage regulator circuit, the load circuit that receives the regulated voltage output from the voltage regulator circuit may have an input capacitor or equivalent capacitance that can give rise to such a current surge. As the magnitude of an initial current surge approaches the maximum current that can be delivered by the voltage source that supplies the voltage regulator, the voltage at the supply voltage source (input to the voltage regulator) will drop. If it drops to a voltage level approaching the target regulated voltage output of one of the voltage regulators being supplied by the voltage source, then the output voltage of that voltage regulator will fall below the target voltage during such a current spike. This is undesirable and may cause errors or malfunctions by the load circuitry fed from the voltage regulator.

FIG. 1 shows an embodiment 100 of voltage supply system with a plurality of voltage regulators 105 connected in parallel to an unregulated voltage source 110, e.g. a battery, etc. Each of the voltage regulators 105 are connected to a corresponding load circuit 115. The voltage regulators 105 have a control terminal 120 by which the voltage regulators 105 are turned OFF and ON by a control voltage. If it is possible to sequence to the turning ON the respective voltage regulators 105, then any concurrent current surge and associated voltage drop induced at the unregulated voltage source can be minimized. However, the demands of the load circuits 115 may make such sequencing undesirable. Additionally, if the surge current from turning one of the voltage regulators 105 from OFF to ON is sufficient to cause the voltage being supplied by the unregulated voltage source to fall below the target voltage output of one of the other voltage regulators 105, then sequencing of the turn ON of the voltage regulators 105 will not eliminate this problem. There exists a need for an improved way to minimize, if not eliminate, such undesired voltage drops at the unregulated voltage source due to turn ON current surge by a voltage regulator.

SUMMARY

It is an object of the present invention to satisfy this need.

An exemplary apparatus provides a regulated DC voltage output from an input supply DC voltage source. A regulation circuit having an input terminal coupled to the supply DC voltage source, an output terminal on which is provided the regulated DC voltage output, and a current control terminal capable of controlling a maximum current that can flow through the regulation circuit where a level of maximum current is controlled proportionate to an amount of resistance connected to the current control terminal. A surge control circuit connected to the current control terminal automatically supplies a variable resistance beginning with one resistance at turn-ON and varying to another resistance at a predetermined time interval after turn-ON to limit the current that can flow at turn-ON until a steady state of the regulation circuit is reached.

An exemplary method controls an initial voltage drop due to a turn-ON current surge at the input of a DC voltage regulator that provides a regulated DC voltage output from an input supply DC voltage source. A variable effective resistance is supplied to a current control terminal of a regulation circuit that is part of the DC voltage regulator upon the start of the initial turn-ON. The amount of resistance provided by the variable resistance corresponds to predetermined associated maximum currents that are permitted to flow through the regulation circuit, with the level of permitted maximum current being proportionate to the amount of resistance. The rate of change of the variable effective resistance is controlled based on a resistance-capacitance (RC) time constant established by a first resistor and a first capacitor coupled to the current control terminal. Automatically, beginning with the turn-ON, the variable effective resistance changes from a first amount of resistance at the turn-ON to a second amount of resistance at a predetermined time following the turn-ON. The first amount of resistance restricting the level of maximum current that can flow through the regulation circuit at the turn-ON to a first current level that is less than a second current level that corresponds to the second amount of resistance. Thus, the maximum current that can be drawn by the DC voltage regulator is controlled to a level that minimizes any voltage drop at the DC voltage source upon turn-ON.

DESCRIPTION OF THE DRAWINGS

Features of exemplary implementations of the invention will become apparent from the description, the claims, and the accompanying drawings in which:

FIG. 1 is a block diagram of an exemplary prior art voltage supply system.

FIG. 2 is a block diagram of an exemplary voltage regulator.

DETAILED DESCRIPTION

Figure 3:
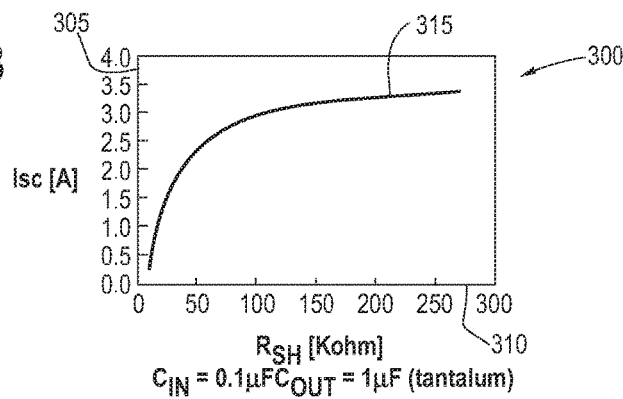
FIG. 3 is a graph of resistance versus maximum allowed current for an exemplary voltage regulator integrated circuit.

FIG. 2 shows a block diagram of a simplified voltage regulator 200. Only those aspects and parameters associated with the voltage regulator 200 that are useful in understanding the improvement in accordance with embodiments of the present invention are described in the interests of clarity and simplification. A voltage regulator integrated circuit (IC) 205 contains circuitry which provides for an adjustable regulated output voltage with a maximum current load of a few amperes. Some voltage regulator ICs have additional characteristics depending upon the particular application, e.g. such as being radiation hardened for use in high radiation environments. One such rad-hardened adjustable voltage regulator is the RHFL 4913A available from ST Microelectronics.

The voltage regulator IC 205 includes a terminal 210 for receiving unregulated DC voltage from a DC voltage supply and a reference ground terminal 215. An output terminal 220 provides a regulated DC voltage output relative to ground terminal 225. It will be apparent to those skilled in the art that the unregulated DC voltage from the DC voltage supply should be higher than the selected target voltage appearing at terminal 220. For example, if a target regulated DC voltage of 3.75 V is desired, then an appropriate value for the unregulated input DC voltage could be 5.0 V or higher. Element 230 connected between the output regulated voltage terminal 220 and corresponding ground 225 represents a capacitor or an equivalent capacitance utilized to provide a low-pass filter action for the regulated DC voltage. An initiate (or inhibit) terminal 235 enables the DC regulator IC to be turned OFF and ON such as by a TTL control voltage. A short circuit current (SCC) terminal 240 provides an input to which one resistor 245 is suggested to be connected to the unregulated input voltage source to provide a fixed over current limitation, e.g. a limit on how much current can flow regardless of the current demand of a circuit connected to its output or even if the output 220 is short circuited to ground 225.

FIG. 3 shows a graph 300 of current versus resistance that allows a designer to select a resistance value for resistor 245 that sets a short circuit current value for the exemplary voltage regulator integrated circuit 205. The current in amperes is shown on the vertical axis 305 and corresponding values of resistance shown in 1000's of ohms (k ohms) are shown on the horizontal axis 310. As the values of a selected resistor increases, the graph 315 shows that the corresponding maximum allowed short circuit current values are non-linear. It will be understood that this specific short circuit current limitation versus resistance characteristic is dependent upon the particular design of the voltage regulator IC.

Figure 4:
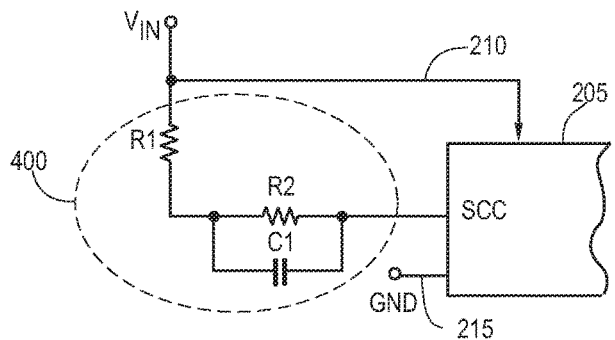
FIG. 4 is a diagram of an exemplary circuit that can be utilized in conjunction with the exemplary voltage regulator integrated circuit to control the initial turn ON current surge.

FIG. 4 shows an exemplary circuit 400 in accordance with the present invention that can be utilized in conjunction with the exemplary voltage regulator IC 205 to control the initial turn-ON current surge while also providing a different level of steady state over current limit, where steady state means during normal ON operation following the initial OFF to ON startup condition. In this exemplary embodiment the circuit 400 includes resistors R1 and R2 connected in series between the unregulated voltage supply and the SCC terminal 240 of the voltage regulator IC 205. The circuit 400 also includes a capacitor C1 connected in parallel across resistor R2 (the resistor connected to the SCC terminal). The following references to ON/OFF states refer to the state of the voltage regulator IC 205 as controlled by terminal 235. During an OFF STATE, the capacitor C1 is discharged by resistor R2 and has substantially 0 V across it. At the initiation of the ON STATE, the resistance value of resistor R1 controls the maximum current level that can flow through IC 205 as the resistance of R2 is effectively short-circuited due to the initial charging of capacitor C1. The SCC terminal may be considered a virtual ground. The capacitor C1 continues to charge in accordance with the R1×C1 time constant. The voltage across capacitor C1 will eventually reach a steady-state such that the voltage at the connection between R1 and R2 will have a value substantially of the input Voltage×R1/(R1+R2). At such time the sum of the resistance of R1+R2 in accordance with the graph of FIG. 3 will set the maximum allowed current value and capacitor C1 will have substantially no influence.

An example with specific circuit values may be helpful in understanding the operation of a circuit. In this example, assume an unregulated supply voltage of 5 VDC and that the regulated voltage output is 3.75 V has a normal steady-state output current load of 0.5 A (ampere) with a maximum anticipated load of 2 A, and has an equivalent output capacitor of 22 µF. For the exemplary voltage regulator IC (RHFL 4913A) the short circuit current protection is suggested by the manufacturer to be set at 1.6×the anticipated current load of 0.5 A, i.e. 0.8 A. In this example, resistor R1 is selected to be 5K ohms, resistor R2 selected to be 100K ohms, and capacitor C1 is selected to be 330 nF. The maximum current limit as seen from FIG. 3 for a resistance of 5K corresponds to approximately 0.5 A and for a resistance of 100K corresponds to approximately 2.8 A. The steady-state effective resistance of about 105K (R1+R2) sets a maximum allowed current of approximately 2.8 A which is consistent with the anticipated normal load of 0.5 A but a maximum anticipated load of 2 A. However, the effective/equivalent resistance of about 5K (R1) at an initial OFF state to ON state turn on condition sets a maximum allowed current of just under 0.5 A. As the capacitor C1 continues to charge following turn-ON, the equivalent resistance as apparent at terminal SCC changes from an effective resistance of 5K at turn ON to a steady state ON condition of 105K, which in turn changes the maximum allowed current at the output of the voltage regulator from just less than 0.5 A to approximately 2.8 A.

Normally, the time constant R1×C1 will be selected to be long enough to prevent the equivalent capacitance associated with capacitor 230 and the equivalent series resistance through which current flows to the capacitor from exceeding a predetermined current value on initial turn ON. The time variable resistance provided by the surge protection circuit allows the initial turn-ON current surge to be limited to less than the maximum current level associated with a later steady state operation. Values of R1 greater than 5K ohms could be selected which would allow a higher initial surge current and could be utilized depending on the current supplying capacity of the voltage source and the total potential maximum current load.

Figure 5:
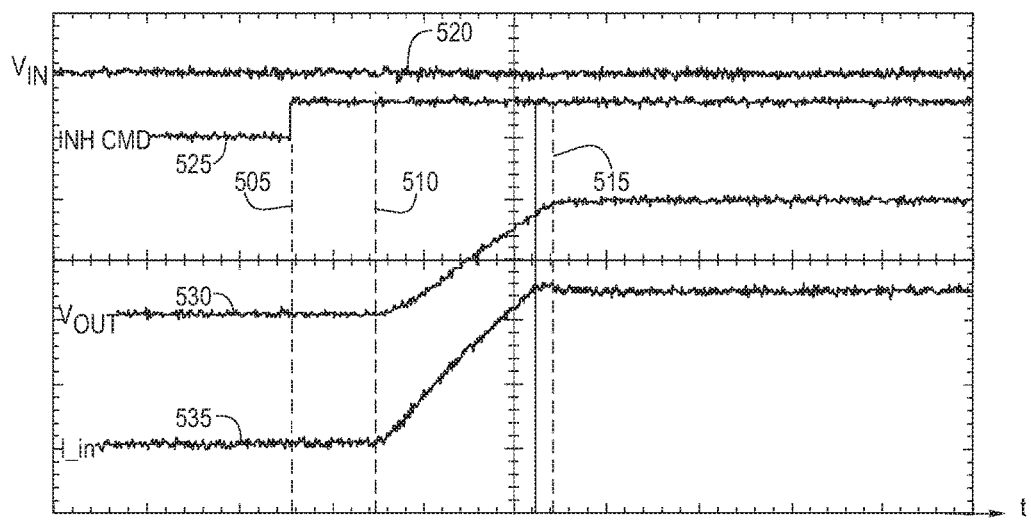
FIG. 5 is a graph showing voltage and current levels versus time following turn-ON of an exemplary voltage regulator using the voltage regulator integrated circuit having exemplary current surge control circuit in accordance with an embodiment of the present invention.

FIG. 5 is a graph showing voltage and current levels versus time following turn-ON on the exemplary voltage regulator 200 that utilizes the exemplary ON current surge control circuit 400. The dashed line 505 represents the initiation of a command at input 235 (INH) to cause the voltage regulator to go from an OFF state to an ON state. Dashed line 510 represents a time delay relative to the time of 505 of approximately 2 ms when the voltage regulator IC 205 begins to transition to the ON state. Dashed line 515 represents the time at which steady-state ON condition is achieved which is approximately 4 ms following time 510. The top line 520 represents the voltage level of the unregulated source supply voltage to the voltage regulator. It will be noted that this voltage level remains constant indicating that the current load presented by the voltage regulator never exceeded the current supplying ability of the unregulated supply. The line 525 represents the control voltage applied to the input 235 (INH) with the change of voltage level at time 505 indicating a command to turn ON. Line 530 represents the regulated DC output voltage of the voltage regulator which transitions from 0 V prior to time 510 to 3.75 V after time 515. Line 535 represents the current flowing into the voltage regulator at terminal 210 from the unregulated power source. The current increases at a similar rate to the previously described voltage at 530 and transitions from approximately 0 A prior to time 510, ramping up until a steady state of 0.5 A is reached at time 515. It will be noted that there is very little and essentially no overshoot or surge current beyond 0.5 A. The variable resistance effectively supplied by circuit 400 during a turn-ON condition restricts what would have otherwise been a higher surge current during the turn ON condition.

In view of the teachings provided herein, other embodiments could be utilized in place of circuit 400 to provide a similar variable resistance condition during a start up interval of the voltage regulator. For example, a plurality of resistors could be connected in series between the unregulated voltage input and terminal 240 with corresponding switches connected in parallel across each resistor with the switches operated sequentially at turn-ON to effectuate a gradually increasing resistance during the startup interval (initial current surge interval). Alternatively, a solid-state device that provides a variable resistance could be controlled to provide an increasing resistance during the startup interval.

Although exemplary implementations of the invention have been depicted and described in detail herein, it will be apparent to those skilled in the art that various modifications, additions, substitutions, and the like can be made without departing from the spirit of the invention. The scope of the invention is defined by the following claims.

The invention claimed is:

1. An apparatus that provides a regulated DC voltage output from an input supply DC voltage source, where the voltage level from the supply DC voltage source is greater than a target voltage level for the regulated DC voltage output, the apparatus comprising:
   a regulation circuit having an input terminal coupled to the supply DC voltage source, an output terminal on which is provided the regulated DC voltage output, and a current control terminal capable of controlling a maximum current that can flow through the regulation circuit where a level of maximum current is controlled proportionate to an amount of current flow into the current control terminal as determined by an effective resistance connected between the supply DC voltage source and the current control terminal, the regulation circuit having a turn-ON time interval when turned from OFF to ON prior to reaching a steady state of operation;
   a surge control circuit connected to the current control terminal where the surge control circuit automatically provides a first amount of current flowing into the current control terminal as determined by resistance in series with the current control terminal during the turn-ON interval and a second amount of current flowing into the current control terminal as determined by resistance in series with the current control terminal during the steady state of operation, the first amount of current restricting the level of current that can flow through the regulation circuit during the turn-ON interval to a first current level that is less than a second current level that corresponds to the second amount of current during the steady state of operation.

2. The apparatus of claim 1 wherein the surge control circuit comprises a first resistor with one end connected to the supply DC voltage source, a second resistor in series between the other end of the first resistor and the current control terminal, and a capacitor connected in parallel across the second resistor.

3. The apparatus of claim 2 where one end of the second resistor and one end of the capacitor are connected to the current control terminal and the other ends of the second resistor and capacitor are connected together and to one end of the first resistor.

4. The apparatus of claim 2 where an RC time constant of the first resistor and the capacitor defines a predetermined time interval that corresponds to at least a portion of the turn-ON interval.

5. The apparatus of claim 2 where the sum of the resistance of the first and second resistors sets the current flow into the current control terminal that sets the maximum current level that can flow through the regulation circuit during the steady state of operation.

6. The apparatus of claim 2 where voltage is substantially zero across the capacitor when the regulation circuit is in the OFF state.

7. The apparatus of claim 2 where the surge control circuit provides an equivalent resistance as sensed by the current control terminal that varies from the first amount of resistance at the start of the turn-ON interval that corresponds to the first maximum allowed current level to the second amount of resistance at the steady state of operation that corresponds to the second maximum allowed current level.

8. A method for controlling an initial voltage drop due to a turn-ON current surge at the input of a DC voltage regulator that provides a regulated DC voltage output from an input from a supply DC voltage source, where the voltage level from the supply DC voltage source is greater than a target voltage level for the regulated DC voltage output, the method comprising the steps of:
   supplying a variable effective resistance in series between the supply DC voltage source and the current control terminal of a regulation circuit that is part of the DC voltage regulator upon the start of the initial turn-ON, the variable effective resistance causing a corresponding variable current to flow into the current control terminal, the amount of resistance provided by the variable resistance corresponding to predetermined associated maximum currents that are permitted to flow through the regulation circuit, a level of permitted maximum current is controlled proportionate to the amount of resistance provided by the variable resistance;
   controlling the rate of change of the variable effective resistance based on a time constant related to a turn-ON time interval until a steady operation is achieved;
   automatically, beginning with the turn-ON, changing the variable effective resistance from a first amount of resistance at the turn-ON to a second amount of resistance at a predetermined time following the turn-ON, the first amount of resistance restricting the level of maximum current that can flow through the regulation circuit at the turn-ON to a first current level that is less than a second current level that corresponds to the second amount of resistance, thereby controlling the maximum current that can be drawn by the DC voltage regulator to a level that minimizes any voltage drop at the DC voltage source upon turn-ON.

9. The method of claim 8 wherein a resistance-capacitance (RC) time constant is established by a first resistor connected in series with a first capacitor with the first capacitor being connected in parallel across a second resistor in series between the first resistor and the current control terminal to form a surge control circuit, the surge control circuit being connected in series with the current control terminal.

10. The method of claim 9 where the RC time constant defines a predetermined time interval following the turn-ON during which the resistance of the variable effective resistance changes.

11. The method of claim 9 where the sum of the series resistance of the first and second resistors sets a maximum current level during steady state of operation of the DC voltage regulator following the turn-ON.

12. The method of claim 9 where voltage is substantially zero across the first capacitor at the time of the turn-ON from an OFF state of the DC voltage regulator.

\* \* \* \* \*